United States Patent
Ahlin et al.

(10) Patent No.: US 8,799,370 B2
(45) Date of Patent: Aug. 5, 2014

(54) SHARE WEB FEEDS THROUGH MESSAGING

(75) Inventors: Eskil Gunnar Ahlin, Veberod (SE); Erica Kato Marcus, Malmo (SE)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 1575 days.

(21) Appl. No.: 11/960,963

(22) Filed: Dec. 20, 2007

(65) Prior Publication Data

US 2009/0164585 A1 Jun. 25, 2009

(51) Int. Cl.
*G06F 15/16* (2006.01)
*H04L 29/08* (2006.01)

(52) U.S. Cl.
CPC ..................... *H04L 67/26* (2013.01)
USPC .......... 709/206; 709/205; 455/435.1

(58) Field of Classification Search
USPC .......... 709/201–209; 455/435.1–437
See application file for complete search history.

(56) References Cited

U.S. PATENT DOCUMENTS

| 6,065,048 | A | 5/2000 | Higley |
| 6,665,711 | B1 * | 12/2003 | Boyle et al. .................. 709/219 |
| 7,337,910 | B2 * | 3/2008 | Cartmell et al. ............. 209/245 |
| 7,412,039 | B2 * | 8/2008 | Carro ........................ 379/88.13 |
| 8,209,383 | B2 * | 6/2012 | Veeramachaneni et al. .. 709/206 |
| 2002/0016818 | A1 * | 2/2002 | Kirani et al. .................. 709/203 |
| 2002/0161838 | A1 * | 10/2002 | Pickover et al. ............. 709/204 |
| 2004/0268265 | A1 | 12/2004 | Berger |
| 2005/0021425 | A1 * | 1/2005 | Casey ............................. 705/28 |
| 2005/0210111 | A1 * | 9/2005 | Fukudome ..................... 709/206 |
| 2006/0059231 | A1 * | 3/2006 | Takatori et al. ............... 709/206 |
| 2006/0073812 | A1 * | 4/2006 | Punaganti Venkata et al. ........................... 455/412.1 |
| 2006/0167860 | A1 * | 7/2006 | Eliashberg et al. ............... 707/3 |
| 2006/0200740 | A1 * | 9/2006 | Kahn et al. ..................... 715/500 |
| 2006/0259474 | A1 * | 11/2006 | Granito .............................. 707/3 |
| 2007/0094321 | A1 | 4/2007 | Nussey et al. |
| 2007/0094391 | A1 * | 4/2007 | Nussey ........................ 709/225 |
| 2007/0100959 | A1 * | 5/2007 | Eichstaedt et al. ............ 709/217 |
| 2007/0143414 | A1 * | 6/2007 | Daigle ......................... 709/206 |
| 2007/0174389 | A1 * | 7/2007 | Armstrong et al. ........... 709/204 |
| 2007/0174394 | A1 * | 7/2007 | Jayaweera ................... 709/206 |
| 2007/0198633 | A1 * | 8/2007 | Thibeault ..................... 709/203 |
| 2007/0282962 | A1 | 12/2007 | Kim |
| 2008/0016177 | A1 * | 1/2008 | Jin et al. ....................... 709/217 |

(Continued)

FOREIGN PATENT DOCUMENTS

CN 101027879 A 8/2007

OTHER PUBLICATIONS

Libby, D., "RSS 0.91 Specification", Netscape Communications, http://www.rssboard.org/rss-0-9-1-netscape, Jul. 10, 1999, 32 pages.

(Continued)

*Primary Examiner* — Catherine Thiaw
(74) *Attorney, Agent, or Firm* — Snyder, Clark, Lesch & Chung, LLP (57) ABSTRACT

A method may include creating a message having a web feed uniform resource locator (URL), providing an indicator in the message that the web feed URL is included in the message, the indicator being in addition to the web feed URL, identifying that the message includes the web feed URL based on the indicator, and associating the web feed URL to a contact entry.

22 Claims, 8 Drawing Sheets

(56) References Cited

U.S. PATENT DOCUMENTS

| | | | |
|---|---|---|---|
| 2008/0021963 A1* | 1/2008 | Jana et al. | 709/206 |
| 2008/0021976 A1* | 1/2008 | Chen et al. | 709/217 |
| 2008/0046543 A1* | 2/2008 | Chasen et al. | 709/219 |
| 2008/0091771 A1* | 4/2008 | Allen et al. | 709/203 |
| 2008/0207182 A1* | 8/2008 | Maharajh et al. | 455/414.1 |
| 2008/0306972 A1* | 12/2008 | Wilkin et al. | 707/100 |
| 2009/0037533 A1* | 2/2009 | Gilfix et al. | 709/205 |
| 2009/0049146 A1* | 2/2009 | Okita et al. | 709/206 |
| 2009/0264111 A1* | 10/2009 | Bernard | 455/414.3 |
| 2009/0286558 A1* | 11/2009 | Zufi et al. | 455/466 |

OTHER PUBLICATIONS

Notification of Transmittal of the International Search Report and the Written Opinion of the International Searching Authority, or the Declaration, corresponding to PCT/IB2008/052403, Mar. 25, 2009, 16 pages.

* cited by examiner

SHARE WEB FEEDS THROUGH MESSAGING

BACKGROUND

With the development of consumer devices, such as mobile phones and personal digital assistants (PDAs), users are afforded an expansive platform to access and exchange information. In turn, our reliance on such devices has comparatively grown in both personal and business settings.

A consumer device may acquire various types of information by subscribing to one or more feeds, such as web feeds. In fact, some web feeds may relate to friends or family members of a user, such as web feeds that provide photos, videos or text posted on a web feed site.

SUMMARY

According to one aspect, a method may include creating a message having a web feed uniform resource locator (URL), and providing an indicator in the message that the web feed URL is included in the message, the indicator being in addition to the web feed URL.

Additionally, the providing may include adding an extension header to the message, the extension header including a character string to indicate that the web feed URL is included in the message.

Additionally, the adding may include adding the extension header having the web feed URL.

Additionally, the providing may include adding a property statement relating to the web feed URL to indicate that the web feed URL is included in the message.

Additionally, the providing may include adding a type property to the web feed URL to indicate that the web feed URL is included in the message.

Additionally, the method may include identifying that the web feed URL is included in the message based on a character string in the web feed URL.

Additionally, the identifying may include recognizing at least one of rss, atom, feed, videofeed, or feeds.

Additionally, the method may include sending the message, receiving the message by a device, identifying that the message includes the web feed URL based on the indicator, and associating the web feed URL to a contact entry in the device, where the contact may be an existing contact entry or a new contact entry.

Additionally, the associating may include recognizing sender information associated with the message, and linking the web feed URL to the contact entry that corresponds to the sender information.

According to another aspect, a device may include a memory to store instructions, and a processor that may execute the instructions. The processor may execute the instructions to create a message having a web feed uniform resource locator (URL) link, and provide an indication in the message that the web feed URL link is included with the message.

Additionally, the instructions to provide an indication may include instructions to add an extension header to the message to provide the indication.

Additionally, the instructions to provide an indication may include instructions to add a type property to the message to provide the indication.

According to still another aspect, a device may include a memory to store instructions and a processor that may execute the instructions. The processor may execute the instructions to receive a message, identify whether the message includes a web feed uniform resource locator (URL) link, and associate the web feed URL link to a contact entry if the message includes the web feed URL link.

Additionally, the instructions to identify may include instructions to inspect the message for an extension header that includes an indication that the message includes the web feed URL link.

Additionally, the instructions to identify may include instructions to recognize a character string in the message that provides an indication that the message includes the web feed URL link.

Additionally, the instructions to associate may include instructions to match sender information of the message to the contact entry, where the contact entry is an existing contact entry or a new contact entry.

Additionally, the instructions to associate may include instructions to prompt a user of the device to associate the web feed URL link to the contact entry, and associate the web feed URL link with the contact entry based on input from the user, where the contact entry is an existing contact entry or a new contact entry.

Additionally, the instructions to identify may include instructions to connect to a document that a URL points, and inspect the document for one or more character strings that indicate that the document is a web feed document.

According to yet another aspect, a computer-readable medium may include instructions executable by at least one processor of a device. The computer-readable medium may include one or more instructions for receiving a user's input to generate a message, one or more instructions for providing an indication in the message that a web feed uniform resource locator (URL) is included in the message, and one or more instructions for transmitting the message.

Additionally, the message may be one of an electronic mail (e-mail) message, an instant messaging service (IMS IM) message, a short messaging service (SMS) message, a multimedia messaging service (MMS) message, an instant messaging and presence service (IMPS) message, or an attachment thereto.

Additionally, the computer-readable medium may include one or more instructions for recognizing that the message includes the web feed URL.

Additionally, the computer-readable medium may include one or more instructions for receiving a message including a second web feed URL, and one or more instructions for identifying that the received message includes the second web feed URL.

Additionally, the computer-readable medium may include one or more instructions for associating the second web feed URL of the received message with a contact entry.

Additionally, the one or more instructions for associating may include one or more instructions for identifying information associated with the sender of the received message that corresponds to the contact entry.

Additionally, the one or more instructions for associating may include one or more instructions for providing a user interface to allow a user to select the contact entry to be associated with the web feed URL, where the contact entry is an existing contact entry or a new contact entry to be created.

BRIEF DESCRIPTION OF THE DRAWINGS

The accompanying drawings, which are incorporated in and constitute a part of this specification, illustrate exemplary embodiments described herein and, together with the description, explain these exemplary embodiments. In the drawings.

DETAILED DESCRIPTION

The following detailed description refers to the accompanying drawings. The same reference numbers in different drawings may identify the same or similar elements. Also, the following description does not limit the invention.

The term "component," as used herein, is intended to be broadly interpreted to include hardware, software, or a combination of hardware and software. The term "message," as used herein, is intended to be broadly interpreted to include, for example, a short message service (SMS) message, a multimedia messaging service (MMS) message, an electronic mail (e-mail) message, a instant messaging and presence service (IMPS) message, an Internet Protocol (IP) multimedia subsystem instant messaging service (IMS-IM) message, and/or an attachment to a message (e.g., an email, a SMS message, etc.). The term "character string," as used herein, is intended to be broadly interpreted to include a symbol (e.g., alphabetic, numeric, alpha-numeric, etc.).

Overview

Figure 1:
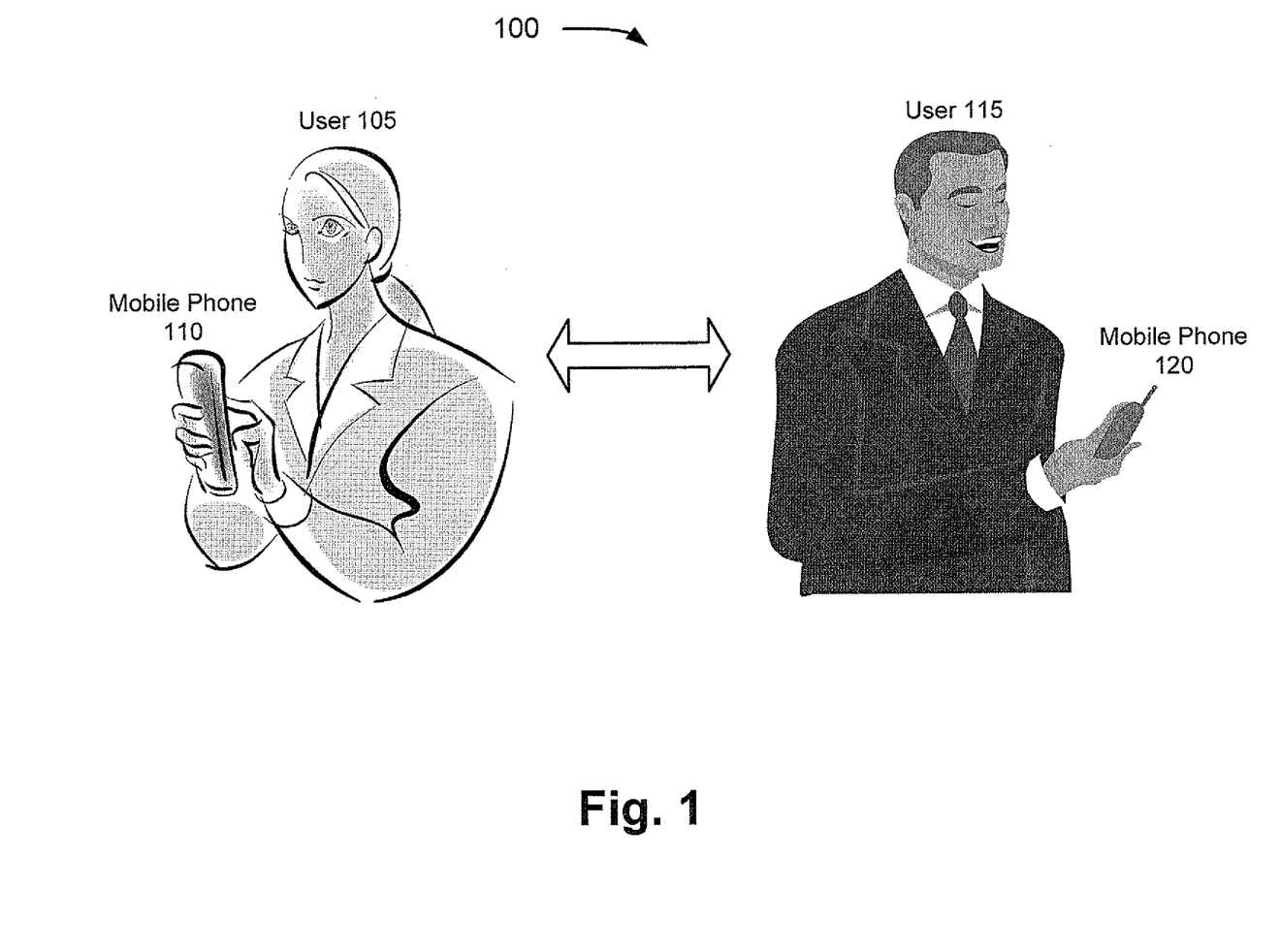
FIG. 1. is a diagram illustrating concepts described herein.

FIG. 1 is a diagram illustrating concepts as described herein. As illustrated in FIG. 1, an environment 100 may include a user 105 and a consumer device, such as a mobile phone 110. For discussion purposes, assume that user 105 recently uploaded some photos on a popular web site (e.g., Flickr). User 105 may send a web feed Uniform Resource Locator (URL) to her friend, user 115, via a message. User 115 may receive the message containing the web feed URL via mobile phone 120. Additionally, mobile phone 120 may be configured to associate the web feed URL to a phonebook entry corresponding to user 105.

As a result of the foregoing, a user may have web feeds associated with contact information, such as a phonebook, to provide a more user friendly interface and management of information relating to friends, family, etc. The concepts described herein have been broadly described in connection with FIG. 1. Accordingly, variations to the concepts in connection with FIG. 1 will be described further in the detailed description provided below.

Exemplary Device

Figure 2:
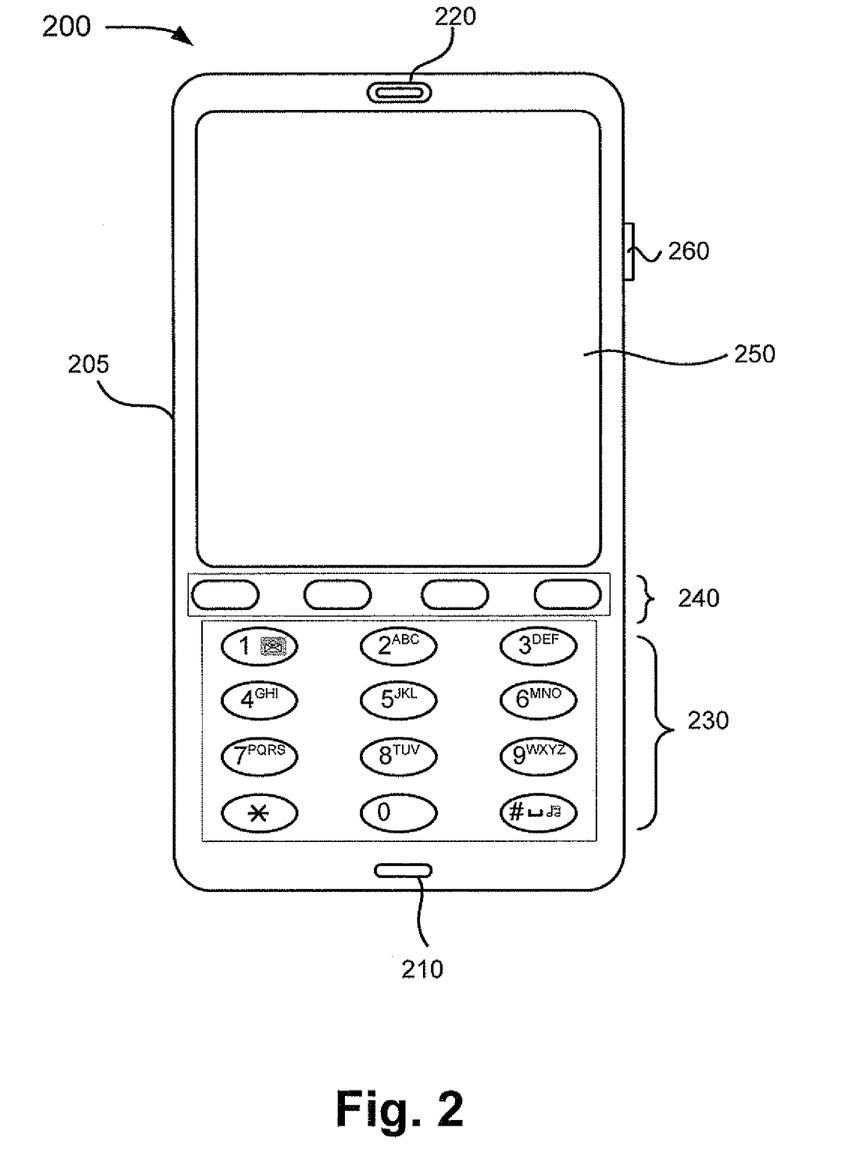
FIG. 2 is a diagram illustrating a front view of exemplary external components of an exemplary device.

FIG. 2 is a diagram illustrating a front view of exemplary external components of an exemplary device 200. As illustrated, device 200 may include a housing 205, a microphone 210, a speaker 220, a keypad 230, function keys 240, a display 250, and/or a camera button 260.

Housing 205 may include a structure to contain components of device 200. For example, housing 205 may be formed from plastic or metal and may support microphone 210, speaker 220, keypad 230, function keys 240, display 250, and camera button 260.

Microphone 210 may include any component capable of transducing air pressure waves to a corresponding electrical signal. For example, a user may speak into microphone 210 during a telephone call. Speaker 220 may include any component capable of transducing an electrical signal to a corresponding sound wave. For example, a user may listen to music or listen to a calling party through speaker 220.

Keypad 230 may include any component capable of providing input to device 200. Keypad 230 may include a standard telephone keypad. Keypad 230 may also include one or more special purpose keys. In one implementation, each key of keypad 230 may be, for example, a pushbutton. A user may utilize keypad 230 for entering information, such as text or a phone number, or activating a special function.

Function keys 240 may include any component capable of providing input to device 200. Function keys 240 may include a key that permits a user to cause device 200 to perform one or more operations. The functionality associated with a key of function keys 240 may change depending on the mode of device 200. For example, function keys 240 may perform a variety of operations, such as placing a telephone call, playing various media (e.g., music, videos), sending e-mail, setting various camera features (e.g., focus, zoom, etc.), accessing the Web, and/or accessing an application. Function keys 240 may include a key that provides a cursor function and a select function. In one implementation, each key of function keys 240 may be, for example, a button.

Display 250 may include any component capable of providing visual information. For example, in one implementation, display 250 may be a liquid crystal display (LCD). In another implementation, display 250 may be any one of other display technologies, such as a plasma display panel (PDP), a field emission display (FED), a thin film transistor (TFT) display, etc. Display 250 may display, for example, text, image, and/or video information to a user. Camera button 260 may be, for example, a push button, to capture an image and/or a video.

Device 200 is intended to be broadly interpreted to include any number of communication devices. For example, device 200 may include a portable device, such as a wireless telephone, a PDA, a computer, or another kind of communication device. In other instances, device 200 may include a stationary device, such as a computer, a telephone, a television (with an Internet Protocol (IP) set top box), or another kind of communication device. Still further, device 200 may include a communication device in an automobile, in an airplane, etc. Accordingly, although FIG. 2 illustrates exemplary external components of device 200, in other implementations, device 200 may contain fewer, different, or additional external components than the external components depicted in FIG. 2. Additionally, or alternatively, one or more external components of device 200 may perform the functions of one or more other external components of device 200. For example, display 250 may be an input component (e.g., a touch screen) and/or keypad 230 may be a touch screen. Additionally, or alternatively, the external components may be arranged differently than the external components depicted in FIG. 2.

Figure 3:
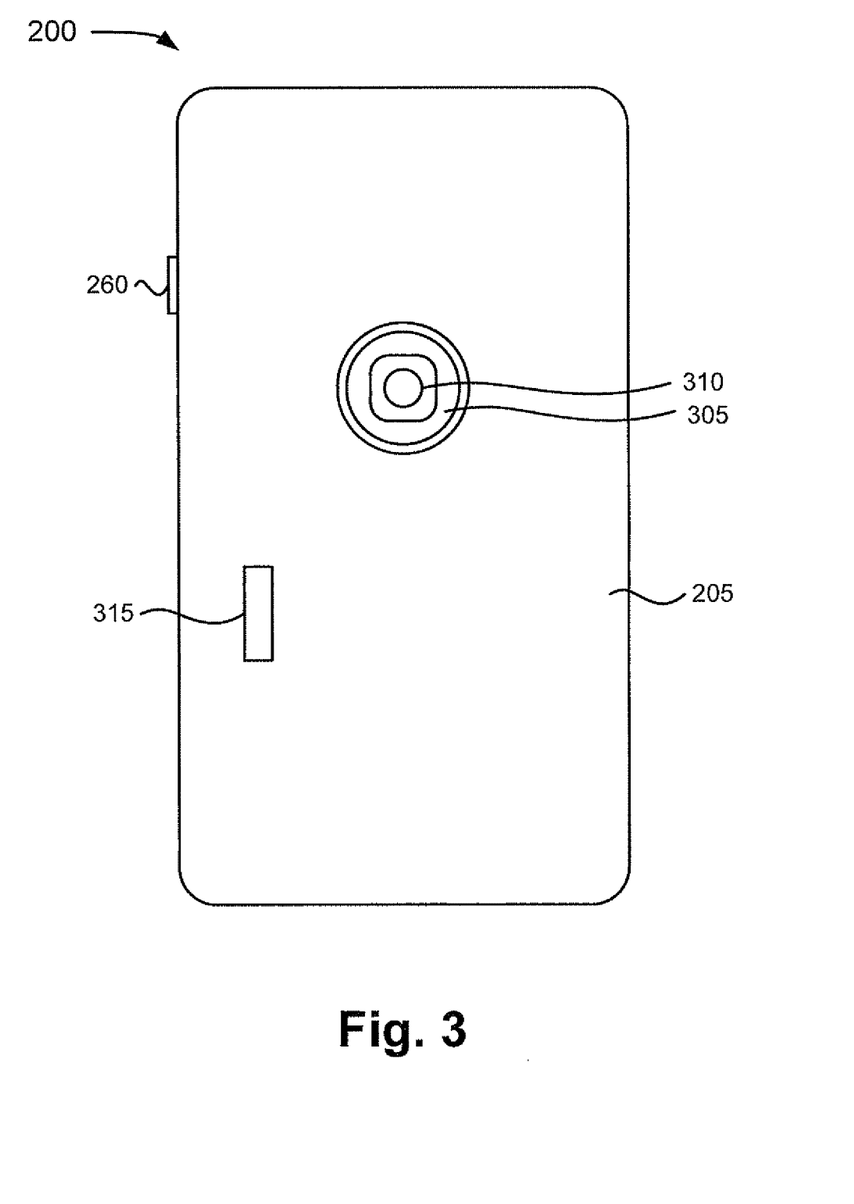
FIG. 3 is a diagram illustrating a rear view of exemplary external components of the device depicted in FIG. 2.

FIG. 3 is a diagram illustrating a rear view of exemplary external components of device 200 depicted in FIG. 2. As illustrated, in addition to the components previously described, device 200 may include a camera 305, a lens assembly 310, and/or a flash 315.

Camera 305 may include any component capable of capturing an image and/or video. Camera 305 may be a digital camera. Display 250 may operate as a view finder when a user of device 200 operates camera 305. Camera 305 may provide for automatic and/or manual adjustment of a camera setting. In one implementation, device 200 may include camera software that is displayable on display 250 to allow a user to adjust a camera setting. For example, a user may be able to adjust a camera setting by operating one or more function keys 240.

Lens assembly 310 may include any component capable of manipulating light so that an image may be captured. Lens assembly 310 may include a number of optical lens elements. The optical lens elements may be of different shapes (e.g., convex, biconvex, plano-convex, concave, etc.) and different distances of separation. In one implementation, lens assembly 310 may be permanently fixed to camera 305. Lens assembly 310 may provide for a variable aperture size (e.g., adjustable f-number).

Flash 315 may include any type of light-emitting component to provide illumination when camera 305 captures an image. For example, flash 315 may be a light-emitting diode (LED) flash (e.g., a white LED) or a xenon flash.

Although FIG. 3 illustrates exemplary external components, in other implementations, device 200 may include fewer, additional, and/or different components than the exemplary external components depicted in FIG. 3. For example, device 200 may not include camera 305 and other components associated therewith. In still other implementations, one or more external components of device 200 may be arranged differently.

Figure 4:
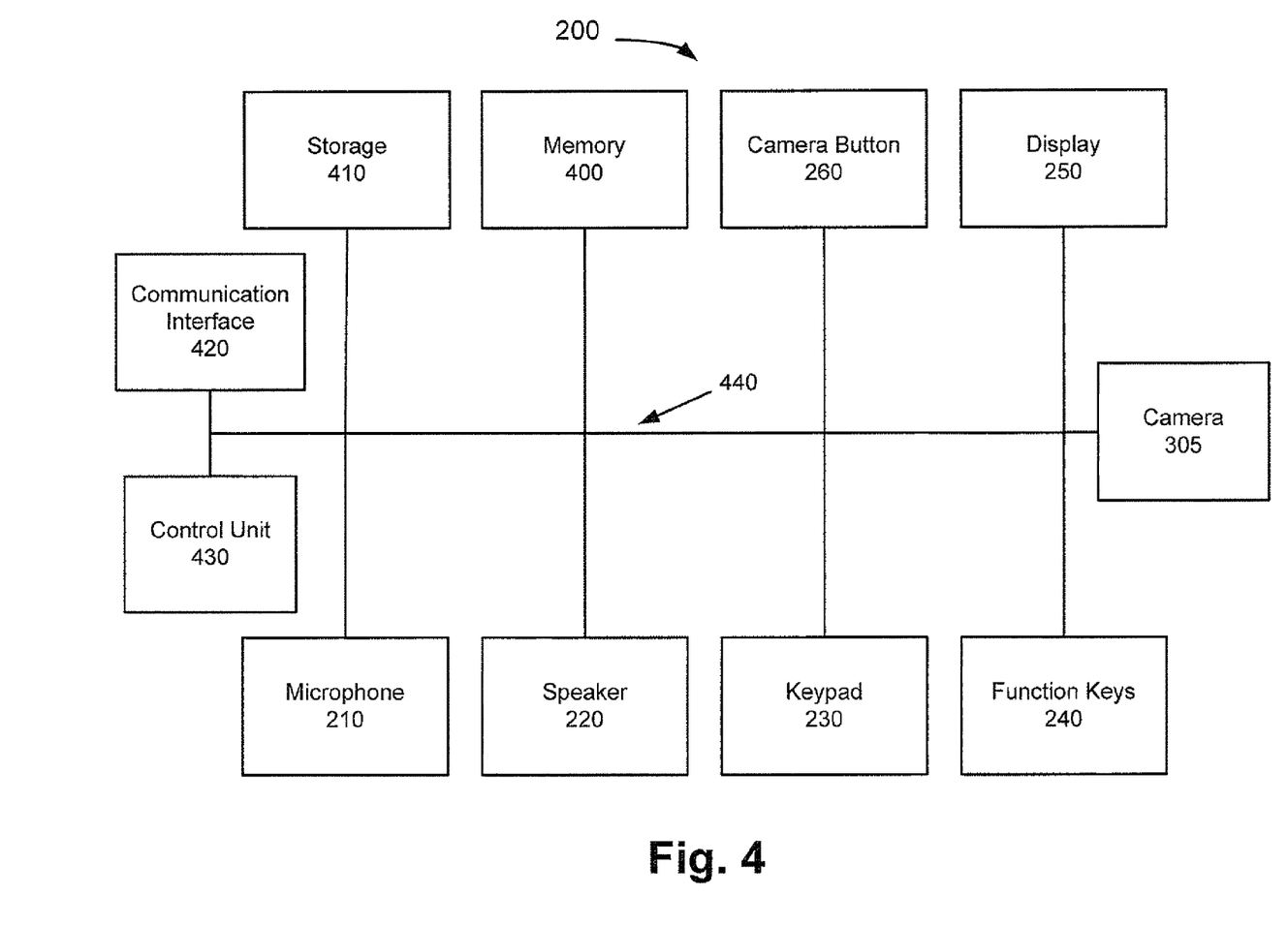
FIG. 4 is a diagram illustrating exemplary internal components of the device depicted in FIG. 2.

FIG. 4 is a diagram illustrating exemplary internal components of device 200 depicted in FIG. 2. As illustrated, device 200 may include microphone 210, speaker 220, keypad 230, function keys 240, display 250, camera button 260, camera 305, a memory 400, a storage 410, a communication interface 420, a control unit 430, and a bus 440. Microphone 210, speaker 220, keypad 230, function keys 240, display 250, camera button 260, and camera 305 may include the features and/or capabilities described above in connection with FIG. 2 and FIG. 3.

Memory 400 may include any component capable of storing data and/or instructions related to the operation and use of device 200. For example, memory 400 may include a storing component, such as a random access memory (RAM), a dynamic random access memory (DRAM), a static random access memory (SRAM), a synchronous dynamic random access memory (SDRAM), a ferroelectric random access memory (FRAM), a read only memory (ROM), a programmable read only memory (PROM), an erasable programmable read only memory (EPROM), an electrically erasable programmable read only memory (EEPROM), and/or a flash memory.

Storage 410 may include a component capable of storing applications. For example, storage 410 may include a storing component, such as a hard disk (e.g., a magnetic disk, an optical disk, a magneto-optic disk), a compact disc (CD), a digital versatile disc (DVD), a floppy disk, a cartridge, or another type of storage medium, or another type of non-transitory computer-readable medium, along with their corresponding drive(s). The applications stored on storage 410 may include, for example, one or more of a phonebook, an address book, camera software, a digital audio player (DAP), a digital media player (DMP), an organizer, a text messenger, a web browser, a calendar, games, etc.

Memory 400 and/or storage 410 may also include a storing component external to and/or removable from device 200, but employable by device 200, such as a Universal Serial Bus (USB) memory stick, a memory card, a subscriber identity module (SIM) card, a hard disk, etc.

Communication interface 420 may include any component capable of transmitting and receiving data. Communication interface 420 may include a radio interface, an optical interface, a coaxial interface, an Ethernet interface, etc. Communication interface 420 may allow for wired or wireless communication with other devices.

Communication interface 420 may implement industry promulgated protocol standards, such as Transmission Control Protocol/Internet Protocol (TCP/IP), Hypertext Transfer Protocol (HTTP), Internet Relay Chat Protocol (IRCP), Real Time Transport Protocol (RTP), Institute of Electrical and Electronics Engineers (IEEE) 802.X protocols, Bluetooth, Ultra Wide Band (UWB), Global System for Mobile communications (GSM)/Universal Mobile Telecommunications System (UMTS), High-Speed Packet Access (HSPA), Code Division, Multiple Access (CDMA), Long Term Evolution (LTE), etc. Additionally, or alternatively, communication interface 420 may implement non-standard, proprietary, and/or customized protocols.

Control unit 430 may include a component that interprets and executes instructions to control the overall operation of device 200. Control unit 430 may include, for example, a general-purpose processor, a microprocessor, a data processor, a co-processor, a network processor, an application specific integrated circuit (ASIC), a controller, a programmable logic device, a chipset, and/or a field programmable gate array (FPGA). Control unit 430 may access instructions from memory 400, from other components of device 200, and/or from a source external to device 200 (e.g., a network or another device).

Control unit 430 may provide for a single operational mode associated with device 200. Additionally, or alternatively, control unit 430 may provide for multiple operational modes associated with device 200, which may operate simultaneously. For example, control unit 430 may simultaneously operate in more than one of a camera mode, a music playing mode, a radio mode (e.g., amplitude modulation/frequency modulation (AM/FM)), and/or a telephone mode.

Bus 440 may include one or more communication paths that allow communication among the components of device 200. Bus 440 may include, for example, a system bus, an address bus, a data bus, and/or a control bus. Bus 440 may include bus drivers, bus arbiters, bus interfaces and/or clocks.

Device 200 may perform certain operations relating to the concepts described herein. Device 200 may perform these operations in response to control unit 430 executing software instructions contained in a computer-readable medium, such as memory 400. A computer-readable medium may be defined as a physical or logical memory device. The software instructions may be read into memory 400 and may cause control unit 430 to perform processes associated with the concepts described herein. Alternatively, hardwired circuitry may be used in place of or in combination with software instructions to implement processes described herein. Thus, implementations described herein are not limited to any specific combination of hardware circuitry and software.

Although FIG. 4 illustrates exemplary internal components, in other implementations, fewer, additional, and/or different internal components than the internal components depicted in FIG. 4 may be employed. For example, one or more internal components of device 200 may include the capabilities of one or more other components of device 200.

For example, communication interface 420 and/or control unit 430 may include their own on-board memory 400 and/or bus 440.

Figure 5:
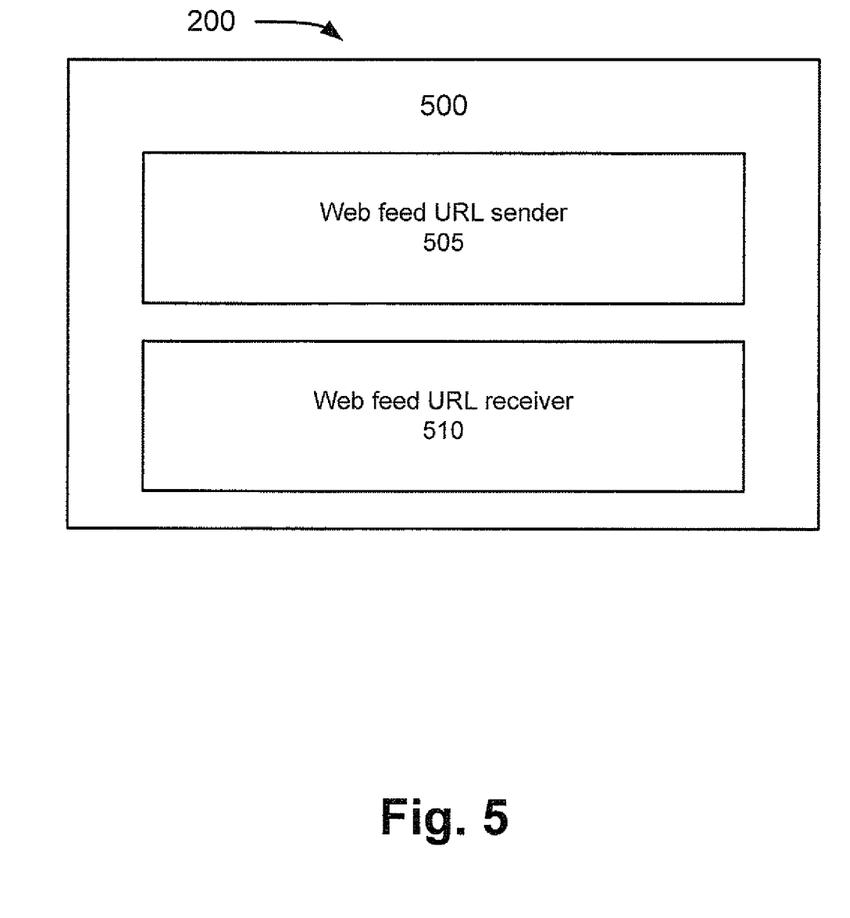
FIG. 5 is a diagram illustrating exemplary components for performing operations that may be associated with the concepts described herein.

FIG. 5 is a diagram illustrating exemplary components for performing operations associated with sending and receiving web feed URLs by device 200. As illustrated in FIG. 5, web feed component 500 may include a web feed URL sender 505 and a web feed URL receiver 510.

Web feed URL sender 505 may be a component that permits a user of device 200 to send one or more web feed URLs to another device. For example, a web feed URL may be sent in a message. Web feed URL sender 505 may employ one or more approaches for packaging the message so that web feed URL receiver 510 of a receiving device (e.g., another device 200 configured in a manner similar to that described above with respect to FIGS. 2 through 4) may recognize that the message contains a web feed URL. In other words, web feed URL receiver 510 may determine that the URL corresponds to a web feed (e.g., a web document or an Internet document) and not, for example, a web site.

In one implementation, web feed URL sender 505 may utilize extension headers. Depending on the type of message (e.g., an e-mail or an MMS message), a web feed URL indicator (e.g., a string of one or more characters) could be placed in an extension header field. In one implementation, the extension header may include the web feed URL. In other types of messages (e.g., an SMS message, etc.), analogous information may be placed in the body of the message (e.g., the URL and/or other portions in the body, including attachments). Given this approach, there are different ways in which device 200 may determine whether to place a web feed URL indicator in the extension header field or elsewhere in the message. For example, in one implementation, web feed URL sender 505 may recognize one or more character strings that indicate that the web URL is a web feed URL. For example, it is not uncommon for a web feed URL to contain the character string "rss," which stands for Really Simple Syndication (a web feed format), or "atom," which is another web feed format. Additionally, or alternatively, web feed URL sender 505 may recognize other types of character strings indicative of a web feed URL, such as the character string "feed" or variation thereof (e.g., "videofeed" or "feeds").

Additionally, or alternatively, a user of device 200 could be prompted when a message contains a URL (e.g., an "http" character string) to indicate to device 200 as to whether the web URL is a web feed URL.

Additionally, or alternatively, web feed URL sender 505 could add a "type" property to the web feed URL. For example, a web feed URL could include the following format: <link href=http://www.idg.se/rss/prlyar type=application/rss+xml title=prylar/>. In this format, for example, a web feed URL may include a link element and a type property. Additionally, or alternatively, web feed URL sender 505 could add another property statement and/or element to the web feed URL.

Web feed URL receiver 510 may include a component that permits a user of device 200 to receive one or more web feed URLs from another device. For example, a web feed URL may be sent in a message. Web feed URL receiver 510 may employ one or more approaches for recognizing that the received message contains a web feed URL.

In one implementation, web feed URL receiver 510 may recognize that a message contains a web feed URL message based on the extension header. As previously described above, a message may include an extension header. The extension header may include, for example, a web feed URL indicator. Web feed URL receiver 510 may recognize the web feed URL indicator in the extension header to determine that a message contains a web feed URL. In the instance that web feed URL receiver 510 recognizes the extension header, web feed URL receiver 510 may not need to parse the message or take some other action to determine whether the message includes a web feed URL. The extension header may or may not be shown to a user of a receiving device 200.

Additionally, or alternatively, web feed URL receiver 510 may parse the body of the message (including attachments) to determine whether the URL is a web feed URL. For example, as previously described, a web feed URL may include one or more character strings indicative of a web feed URL, such as "rss," "atom," "feed," etc. Web feed URL receiver 510 may parse the body of a message to determine whether one or more of these character strings are present in the web feed URL. Additionally, or alternatively, web feed URL receiver 510 may identify a property (e.g., a "type" property) in the Web feed URL that indicates that the URL is a web feed URL.

Additionally, or alternatively, portions of the message, other than the web feed URL specifically, may be parsed to determine whether the web URL is a web feed URL. For example, a user may send a message "I am sending you a web link to my latest video on YouTube." Web feed URL receiver 510 may parse this portion of the message to determine that the web URL is a web feed URL.

Additionally, or alternatively, in the instances that a user receives a message containing a URL and connects to the corresponding document (e.g., a web site or an Internet site), web feed URL receiver 510 may inspect the document to determine whether the document corresponds to a web feed or not based on key words. For example, an RSS document, according to the Extensible Markup Language (XML) standard, may include the following text: "<?xml version=" and "<rss". An Atom document, may include the following text: "<?xml version=" and "Atom." In this way, web feed URL receiver 510 may examine the document (e.g., the source in some cases), and may be able to determine whether the URL in the message points to a web feed. In other words, if the document includes text relating to an RSS document, an Atom document, or some other format having key words, then web feed URL receiver 510 may recognize that the message includes a web feed.

Although FIG. 5 illustrates exemplary components, in other implementations, fewer, additional, and/or different components than those described in relation to FIG. 5 may be employed.

Figure 6:
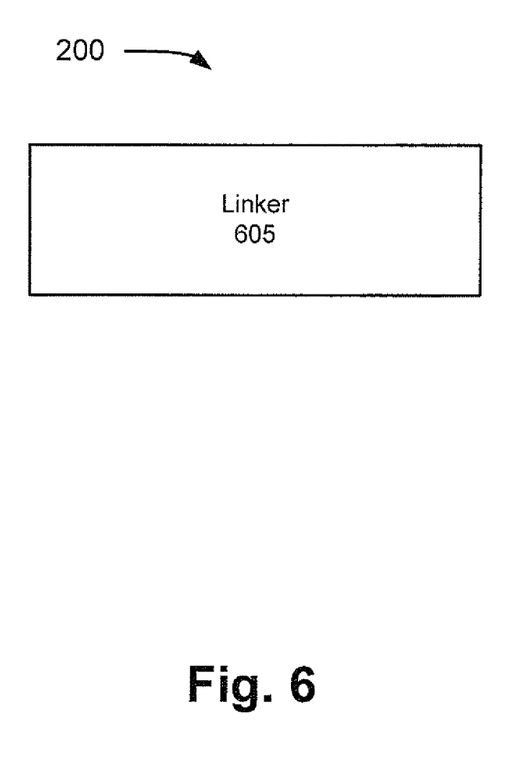
FIG. 6 is a diagram illustrating an exemplary component for performing operations that may be associated with the concepts described herein.

FIG. 6 is a diagram illustrating an exemplary component for performing operations associated with associating a web feed URL to a contact entry in device 200. The contact entry may be an existing contact entry or a new contact entry. As illustrated in FIG. 6, a linker 605 may associate a web feed URL with a contact entry. The term "associate," may include incorporating or linking the web feed URL as a part of contact information relating to the contact entry. For example, the contact entry may include contact information, such as the name of a person, a telephone number of a person, and/or an e-mail address of a person. Linker 605 may associate the web feed URL with a contact entry once the web URL is determined to be a web feed URL.

Linker 605 may determine which contact entry to associate the web feed URL based on information included in the message. For example, depending on the message received (e.g., an e-mail), the message may include a "from" portion that provides the name of the sender and/or the e-mail address of the sender. In other types of messages (e.g., an IMS-IM message), the telephone number of the sending party may be included or some other identifier (e.g., a Skype ID, an Internet Protocol (IP) address, or a Session Initiation Protocol (SIP) URL). In either case, linker 605 may compare this portion of the message to, for example, the contact entries in device 200. If a match occurs, linker 605 may be able to associate the web feed URL to the matching contact entry. In other instances, linker 605 may create a new contact entry.

Additionally, or alternatively, if a user accesses the web feed document corresponding to the web feed URL, information associated with the web feed document may be used by linker 605 to associate the web feed URL to a contact entry. For example, a web feed document may include a person's name or some other identifying information.

Linker 605 may also provide a graphical user interface (GUI) to prompt a user whether he/she would like to associate the web feed URL to a contact entry. Additionally, or alternatively, depending on the web feed content, linker 605 may associate a web feed URL with more than one contact entry. For example, a video or a photo associated with a web feed URL may include friends that each has their own contact information. In this way, linker 605 may allow a user to select a contact entry and/or add a new contact entry to associate the web feed URL, in addition to, for example, the sending party of the web feed URL. Linker 605 and/or other components of device 200 may provide for user preferences related to these aspects, such as automatic association, prompting the user to confirm an association, allowing the user to select a contact entry, etc.

Although FIG. 6 illustrates an exemplary component, in other implementations, fewer, additional, and/or different components than those described in relation to FIG. 6 may be employed.

Figure 7:
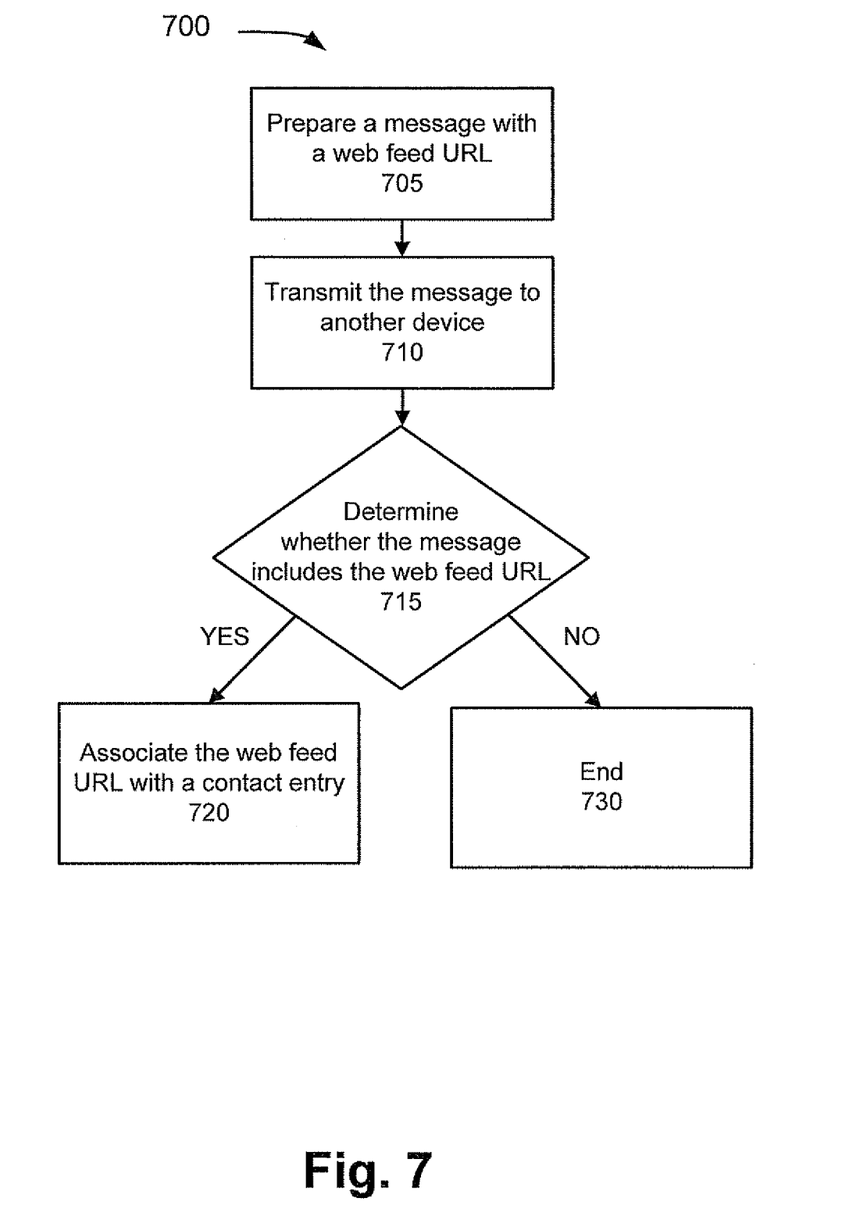
FIG. 7 is a flow chart illustrating an exemplary process for performing operations that may be associated with the concepts described herein.

FIG. 7 is a flow chart illustrating an exemplary process 700 for performing operations that may be associated with the concepts described herein. Process 700 may begin with preparing a message with a web feed URL (block 705). For example, web feed component 500 may prepare a message that includes a web feed URL so that the web feed URL may be recognized by device 200 receiving the message. As previously described in connection to FIG. 5, in one implementation, web feed URL sender 505 may provide for a web feed URL indicator in an extension header. Additionally, or alternatively, web feed URL sender 505 may add an extension property, (e.g., a "type" property) to, for example, the web feed URL. Web feed URL sender 505 may provide for a web feed URL indicator and/or add an extension property to the web feed URL based on identifying certain character strings and/or prompting a user of device 200. For example, web feed URL sender 505 may identify certain character strings as described below in block 715. Additionally, or alternatively, web feed URL sender 505 may prompt a user as to whether a message, a URL, etc., includes a web feed URL.

Device may then transmit the message to another device (block 710). For example, device 200 may transmit the message to another device via communication interface 420. The message may be an e-mail message, an IMS-IM message, an SMS message, etc. The web feed URL may be contained in message (e.g., the body of the message, a file attached to the message, a header of the message, etc.). The message may include more than one web feed URL and/or the message may be sent to more than one device.

A receiving device may determine whether the message includes the web feed URL (block 715). For example, web feed URL receiver 510 in a receiving device 200 may inspect various portions of the message to determine whether the message includes a web feed URL. In one implementation, web feed URL receiver 510 in the receiving device 200 may inspect an extension header of the message. Additionally, or alternatively, web feed URL receiver 510 in the receiving device 200 may inspect the body of the message or an attachment to the message. For example, as previously described above, web feed URL receiver 510 may determine whether certain character strings are present (e.g., rss, atom, feed, type, etc.). Additionally, or alternatively, in instances that a user receiving the message connects to the document corresponding to the URL, web feed URL receiver 510 in the receiving device 200 may determine whether certain character strings are present (e.g., <xml-, rss, atom, etc.) to indicate that the web URL is a web feed URL. For example, web feed URL receiver 510 may determine based on, for example, inspecting the document for key words (in the source, or elsewhere) that the URL received corresponds to a web feed and not, for example, a web site.

If the receiving device 200 determines that the message includes the web feed URL (block 715-YES), then the receiving device 200 may associate the web feed URL with a contact entry (block 720). For example, linker 605 may automatically associate the web feed URL with a contact entry of a phonebook in device 200. As previously described above in connection to FIG. 6, linker 605 may determine which contact entry to associate the web feed URL with based on information included in the message. For example, information may include, for example, a name of a person, an e-mail address, a telephone number, etc. Linker 605 may then search a contacts list stored in the receiving device 200 to attempt to identify a match. If a match occurs, linker 605 may associate the web feed URL with the contact entry. If a match does not occur, linker 605 may prompt the user to add a new contact entry.

Further, as previously described, linker 605 may provide a user of device 200 with a GUI and various prompts to allow a user to select certain user preferences. For example, a user may store a web feed URL with multiple contacts. Additionally, or alternatively, the GUI may provide for prompting a user before storing a web feed URL, and/or a user preference may provide for automatic association with one or more contact entries. Additionally, or alternatively, the GUI may allow for a user to accept, select, and/or change associations based on a user's input.

If device 200 determines that the message does not include the web feed URL (block 715-NO), then the process ends. That is, the message may be treated as a regular message and simply read by a user.

Although FIG. 7 illustrates an exemplary process, in other implementations, fewer, additional or different operations than those depicted in FIG. 7 may be performed.

EXAMPLE

Figure 8:
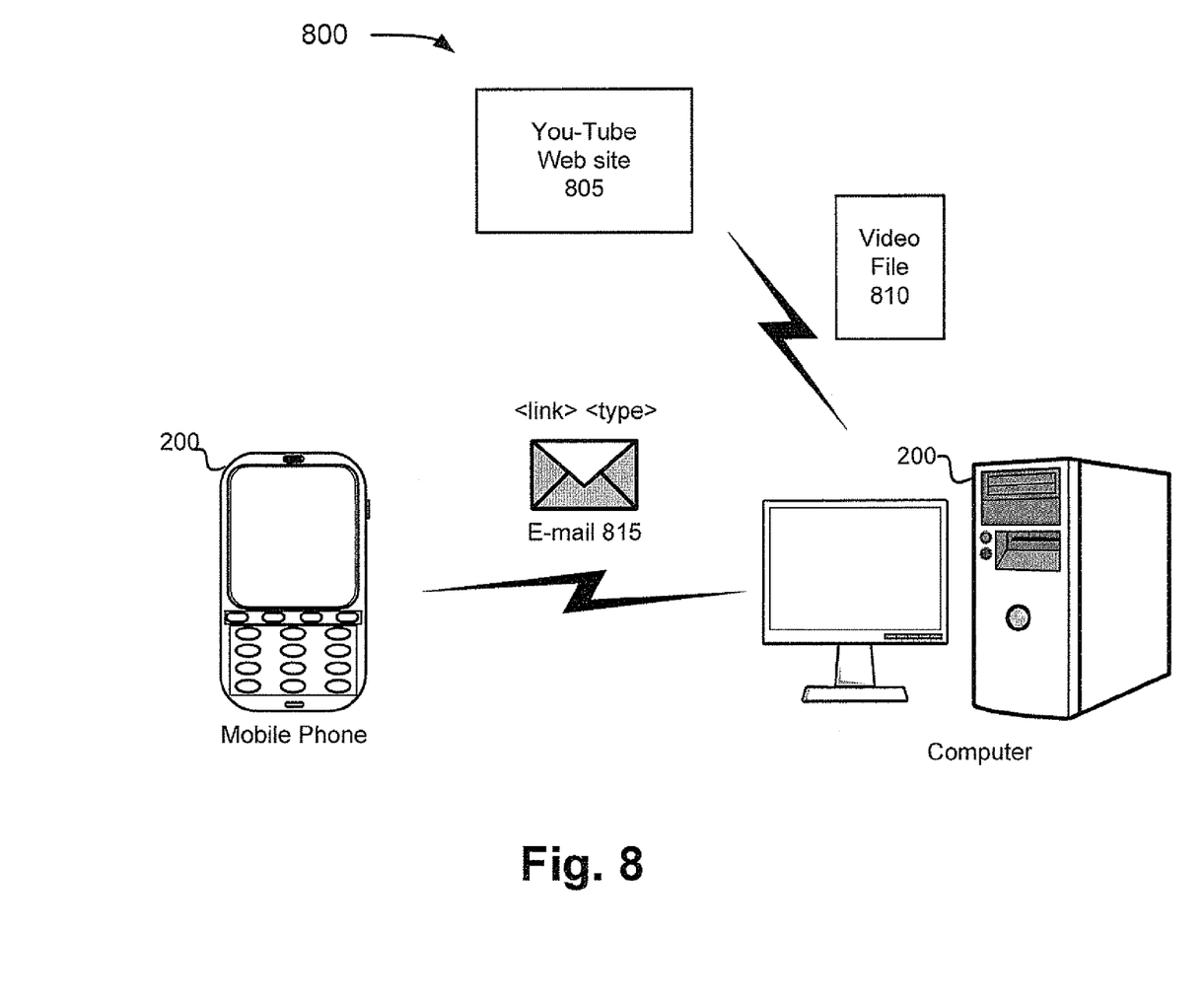
FIG. 8 is a diagram illustrating an example of the concepts described herein.

FIG. 8 is a diagram illustrating an example of the concepts described herein in connection with an exemplary environment 800. For purposes of discussion, assume that John (not illustrated) decides to upload some recent videos to a web site, such as You-Tube web site 805, using a device 200, such as a computer. After John uploads a video file 810 to the You-Tube web site 805, John decides to send the web feed URL to a friend, Mark (not illustrated). For example, John decides to send an e-mail 815 to another device 200, such as a mobile phone. As John prepares e-mail 815, web feed URL sender 505 recognizes that the URL link contained in e-mail 815 contains the character string "rss," and based on this recognition adds a "type" property to the web feed URL link in e-mail 815. When the mobile phone 200 receives e-mail 815, web feed URL receiver 510 in the receiving device (i.e., mobile phone 200) determines that e-mail 815 includes a web feed URL. Linker 605 in mobile phone 200 may then associate the web feed URL to a contact entry corresponding to John in Mark's phonebook included in mobile phone 200 based on, for example, John's e-mail address.

Conclusion

The foregoing description of implementations provides illustration, but is not intended to be exhaustive or to limit the implementations to the precise form disclosed. Modifications and variations are possible in light of the above teachings or may be acquired from practice of the teachings.

It should be emphasized that the term "comprises" or "comprising" when used in the specification is taken to specify the presence of stated features, integers, steps, or components but does not preclude the presence or addition of one or more other features, integers, steps, components, or groups thereof.

In addition, while a series of blocks has been described with regard to processes illustrated in FIG. 7, the order of the blocks may be modified in other implementations. Further, non-dependent blocks may be performed in parallel. Further one or more blocks may be omitted.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the implementations described herein unless explicitly described as such. Also, as used herein, the article "a" and "an" are intended to include one or more items. Where only one item is intended, the term "one" or similar language is used. Further, the phrase "based on" is intended to mean "based, at least in part, on" unless explicitly stated otherwise. As used herein, the term "and/or" includes any and all combinations of one or more of the associated list items.

What is claimed is:

1. A method, comprising:
   receiving, by a mobile device, an electronic message that includes a web feed uniform resource locator (URL), where the electronic message corresponds to one of an e-mail message, a short message service message, a multimedia messaging service message, an instant messaging and presence service message, an Internet Protocol multimedia subsystem instant messaging service message, or an attachment to an e-mail message;
   determining, by the mobile device, whether the web feed URL includes a character string that identifies the web feed URL as a web feed URL;
   recognizing, by the mobile device, sender information associated with the electronic message; and
   associating, by the mobile device, the web feed URL with a contact entry in the mobile device in response to determining that the web feed URL includes the character string that identifies the web feed URL as a web feed URL, where the contact entry is an existing contact entry or a new contact entry, where the associating includes linking the web feed URL to the contact entry that corresponds to the sender information.

2. The method of claim 1, where the electronic message further comprises;
   an indicator to indicate that the web feed URL is included in the electronic message, where the indicator includes an extension header to the electronic message, the extension header including the character string to indicate that the web feed URL is included in the electronic message.

3. The method of claim 2, where the extension header includes the web feed URL.

4. The method of claim 2, where the electronic message further comprises:
   a property statement relating to the web feed URL to indicate that the web feed URL is included in the electronic message.

5. The method of claim 2, where the electronic message further comprises:
   a type property in the web feed URL to indicate that the web feed URL is included in the electronic message.

6. The method of claim 1, where the determining comprises:
   identifying the character string in the web feed URL, the character string indicating that the web feed URL is a web feed URL.

7. The method of claim 6, where the character string comprises at least one of: really simple syndication (rss), atom, feed, videofeed, or feeds.

8. The method of claim 1,
   wherein the contact entry corresponds to a phonebook entry.

9. A device comprising:
   a memory to store instructions; and
   a processor to execute the instructions to:
      receive an electronic message that includes a web feed uniform resource locator (URL) link, where the electronic message corresponds to one of an e-mail message, a short message service message, a multimedia messaging service message, an instant messaging and presence service message, an Internet Protocol multimedia subsystem instant messaging service message, or an attachment to an e-mail message,
      identify that the electronic message includes the web feed URL link based on a character string of the web feed URL link or an indicator that indicates that the electronic message includes the web feed URL link, and
      associate the web feed URL link to a contact entry associated with a sender of the electronic message in response to determining that the electronic message includes the web feed URL link.

10. The device of claim 9, where the processor is further to execute the instructions to:
    inspect the electronic message for an extension header that includes an indication that the electronic message includes the web feed URL link.

11. The device of claim 9, where the processor is further to execute the instructions to:
    recognize the character string, in the web feed URL link, that provides an indication that the electronic message includes the web feed URL link, where the character string includes at least one of: really simple syndication (rss), atom, feed, videofeed, or feeds.

12. The device of claim 9, where the processor is further to execute the instructions to:
  match sender information of the electronic message to the contact entry, where the contact entry is an existing contact entry or a new contact entry.

13. The device of claim 9, where the processor is further to execute the instructions to:
  prompt a user of the device to associate the web feed URL link to the contact entry; and
  associate the web feed URL link with the contact entry based on input from the user, where the contact entry is an existing contact entry or a new contact entry.

14. The device of claim 9, where the instructions to identify further comprise instructions to:
  connect to a document to which the web feed URL link points; and
  inspect the document for one or more character strings that verify that the document is a web feed document.

15. A non-transitory computer-readable medium containing instructions executable by at least one processor of a device, the instructions comprising:
  one or more instructions for receiving an electronic message that includes a web feed uniform resource locator (URL), where the electronic message corresponds to one of an e-mail message, a short message service message, a multimedia messaging service message, an instant messaging and presence service message, an Internet Protocol multimedia subsystem instant messaging service message, or an attachment to an e-mail message;
  one or more instructions for determining whether the web feed URL includes a character string that identifies the web feed URL as a web feed URL;
  one or more instructions for recognizing sender information associated with the electronic message; and
  one or more instructions for associating the web feed URL to a contact entry of the device when it is determined that the web feed URL includes the character string that identifies the web feed URL as a web feed URL, where the one or more instructions for associating includes one or more instructions for linking the web feed URL to the contact entry that corresponds to the sender information.

16. The non-transitory computer-readable medium of claim 15, where the-character string corresponds to at least one of: really simple syndication (rss), atom, feed, videofeed, or feeds.

17. The non-transitory computer-readable medium of claim 15, further comprising:
  one or more instructions for determining whether an indicator, in the electronic message, indicates that the web feed URL is included in the electronic message; and
  one or more instructions for associating the web feed URL link to the contact entry when it is determined that the electronic message includes the indicator that indicates that the web feed URL is included in the electronic message.

18. The non-transitory computer-readable medium of claim 17, where:
  the electronic message includes an extension header that corresponds to the indicator to indicate that the web feed URL is included in the electronic message.

19. The non-transitory computer-readable medium of claim 15, further comprising:
  one or more instructions for receiving another electronic message including a second web feed URL; and
  one or more instructions for identifying that the other received electronic message includes the second web feed URL.

20. The non-transitory computer-readable medium of claim 19, further comprising:
  one or more instructions for associating the second web feed URL of the received other electronic message with another contact entry.

21. The non-transitory computer-readable medium of claim 20, where the one or more instructions for associating comprise:
  one or more instructions for identifying information, associated with a sender of the received electronic message, that corresponds to the other contract entry.

22. The non-transitory computer-readable medium of claim 20, where the one or more instructions for associating comprise:
  one or more instructions for providing a user interface to allow a user to select the other contact entry to be associated with the second web feed URL, where the other contact entry is an existing contact entry or a new contact entry to be created.

\* \* \* \* \*